US010565167B2

(12) United States Patent
Kinsman et al.

(10) Patent No.: US 10,565,167 B2
(45) Date of Patent: Feb. 18, 2020

(54) METHOD AND APPARATUS FOR PEER-TO-PEER FILE AUTHORING

(71) Applicant: Arroware Industries, Inc., Ohsweken (CA)

(72) Inventors: Philip James Kinsman, Burlington (CA); Harvey Christopher Howard Medcalf, Ancaster (CA); Ho Fai Ko, Mississauga (CA); Adam Bruce Kinsman, Brantford (CA)

( * ) Notice: Subject to any disclaimer, the term of this patent is extended or adjusted under 35 U.S.C. 154(b) by 0 days.

(21) Appl. No.: 14/310,028

(22) Filed: Jun. 20, 2014

(65) Prior Publication Data

US 2014/0379641 A1 Dec. 25, 2014

Related U.S. Application Data

(60) Provisional application No. 61/837,811, filed on Jun. 21, 2013.

(51) Int. Cl.
*G06F 16/178* (2019.01)
(52) U.S. Cl.
CPC .................................. *G06F 16/178* (2019.01)
(58) Field of Classification Search
None
See application file for complete search history.

(56) References Cited

U.S. PATENT DOCUMENTS

| 8,417,666 B2 | 4/2013 | Bailor et al. |
| 2003/0233455 A1 | 12/2003 | Leber et al. |
| 2004/0158586 A1 | 8/2004 | Tsai |
| 2004/0181487 A1* | 9/2004 | Hanson ................... G06F 21/10 705/52 |
| 2005/0289237 A1* | 12/2005 | Matsubara et al. ........... 709/232 |
| 2007/0174471 A1 | 7/2007 | Van Rossum |
| 2008/0049619 A1* | 2/2008 | Twiss ...................... H04L 45/04 370/236 |
| 2008/0059539 A1 | 3/2008 | Chin |
| 2008/0148225 A1* | 6/2008 | Sarkar ....................... G06F 8/10 717/107 |
| 2009/0210459 A1 | 8/2009 | Nair |
| 2009/0271447 A1* | 10/2009 | Shin .................. G06F 17/30194 |
| 2011/0078129 A1 | 3/2011 | Chunilal |
| 2011/0218964 A1* | 9/2011 | Hagan ............... G06F 17/30581 707/626 |
| 2011/0289150 A1* | 11/2011 | Westaway et al. ........... 709/205 |
| 2011/0302636 A1 | 12/2011 | Dunkeld et al. |

(Continued)

OTHER PUBLICATIONS

U.S. Appl. No. 13/837,943, filed Mar. 15, 2013, Kinsman et al.

*Primary Examiner* — Matthew J Ellis
(74) *Attorney, Agent, or Firm* — Hunton AK LLP

(57) ABSTRACT

Co-authoring of a digital content file using content contributed by peer devices in a peer-to-peer communications network is described. A local copy of the digital content file is stored in each of plural peer communications devices disposed in a multi-node communications network. The contents of the local copies of the digital content file stored in at least two peer communications devices are compared and in an event the local copies of the digital content file stored in a peer communications device is missing content that is contained in the other compared peer communications devices, the missing content is merged into the local copy of the digital content file stored in the peer communications device.

27 Claims, 5 Drawing Sheets

(56) References Cited

U.S. PATENT DOCUMENTS

| | | |
|---|---|---|
| 2012/0192055 A1* | 7/2012 | Antebi et al. .................. 715/229 |
| 2012/0330887 A1* | 12/2012 | Young ..................... H04L 67/10 |
| | | 707/610 |
| 2013/0111513 A1 | 5/2013 | Gaude |
| 2013/0151940 A1 | 6/2013 | Bailor |
| 2013/0166698 A1 | 6/2013 | Georgis et al. |
| 2013/0173530 A1* | 7/2013 | Laron ............... G06F 17/30165 |
| | | 707/608 |
| 2013/0283147 A1* | 10/2013 | Wong ..................... G06F 17/21 |
| | | 715/234 |

* cited by examiner

METHOD AND APPARATUS FOR PEER-TO-PEER FILE AUTHORING

RELATED APPLICATIONS

This application claims the benefit of and priority to U.S. Provisional Application No. 61/837,811, filed on Jun. 21, 2013, the entirety of which is incorporated herein by reference.

FIELD OF INVENTION

The present application generally relates to co-authoring of digital content by peer communications devices disposed in a communications system.

BACKGROUND

Communications device (e.g., personal computers, laptop computers, smart phones, tablets, etc.) users often operate more than one communications device. For example, an individual may use a personal computer (PC) at his/her place of business to create a file and/or to make changes to the created file. This individual may wish to continue working and making changes to the created file while away from his/her place of business using other communications devices (e.g., smart phone, tablet, laptop computer, or another personal computer). This individual may further wish to allow other communications device users to work on the created file and/or make their own contributions and changes to the created file.

Available file sharing and co-authoring techniques rely on a server to store a master copy of the created file. The individual user can access and work on this master copy of the created file using his/her various communications devices. Given appropriate permissions, other communications device users can also access this master file and make their own individual contributions to the file. Various synchronization schemes can then be used to synchronize the changes made by each user to the master file.

However, maintaining a large group of user's data on a centralized facility (e.g., server) can be demanding from both storage (e.g. disk space) and networking perspectives. Additionally, a centralized facility hosting a large amount of valuable data can pose security concerns since it can be a focused target for hackers.

SUMMARY

A method, computerized system, and computer program product according to some embodiments disclosed herein relates to co-authoring a digital content file. A local copy of the digital content file is stored in a plurality of peer communications devices disposed in a multi-node communications network and the contents of the local copies of the digital content file stored in at least two peer communications devices are compared. In an event the local copy of the digital content file stored in a peer communications device is missing content contained in the other compared peer communications devices, the missing content is merged into the local copy of the digital content file stored in the peer communications device.

In other examples, any of the aspects above, or any system, method, apparatus, and computer program product method described herein, can include one or more of the following features.

The local copy of the digital content file can be stored as a function of creating the digital content file by an originating peer communications device. The digital content file can be created by obtaining a file identifier for uniquely identifying the digital content file within the communications network and propagating the file identifier to other peer communications devices disposed in the multi-node communications network. Each of the local copies of the digital content file can be identified using the file identifier. The file identifier can be obtained from a connection manager that monitors connectivity of the plurality of communications peer devices to the communications network. The connection manager can be included in a server.

The peer communications device can receive information regarding the contents of the local copies stored at the other compared peer communications devices and compare the contents of the local copy of the digital content file stored in the peer communications device with the received information.

The contents of the local copies of the digital content file stored in the at least two peer communications devices can be compared by dividing the contents of the local copies into a number of portions, comparing the portions, and continuing to divide the content portions into smaller portions and comparing the portions until the missing content is identified.

The missing content can be merged into the local copy of the digital content file stored in the peer communications device upon receiving agreement from the at least two peer communications devices.

The content of the local copies of the digital content file stored in at least two peer communications devices can be compared in response to a trigger signal generated by at least one of the peer communications devices. The trigger signal can be generated by at least one of accessing or opening a local copy of the digital content file.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
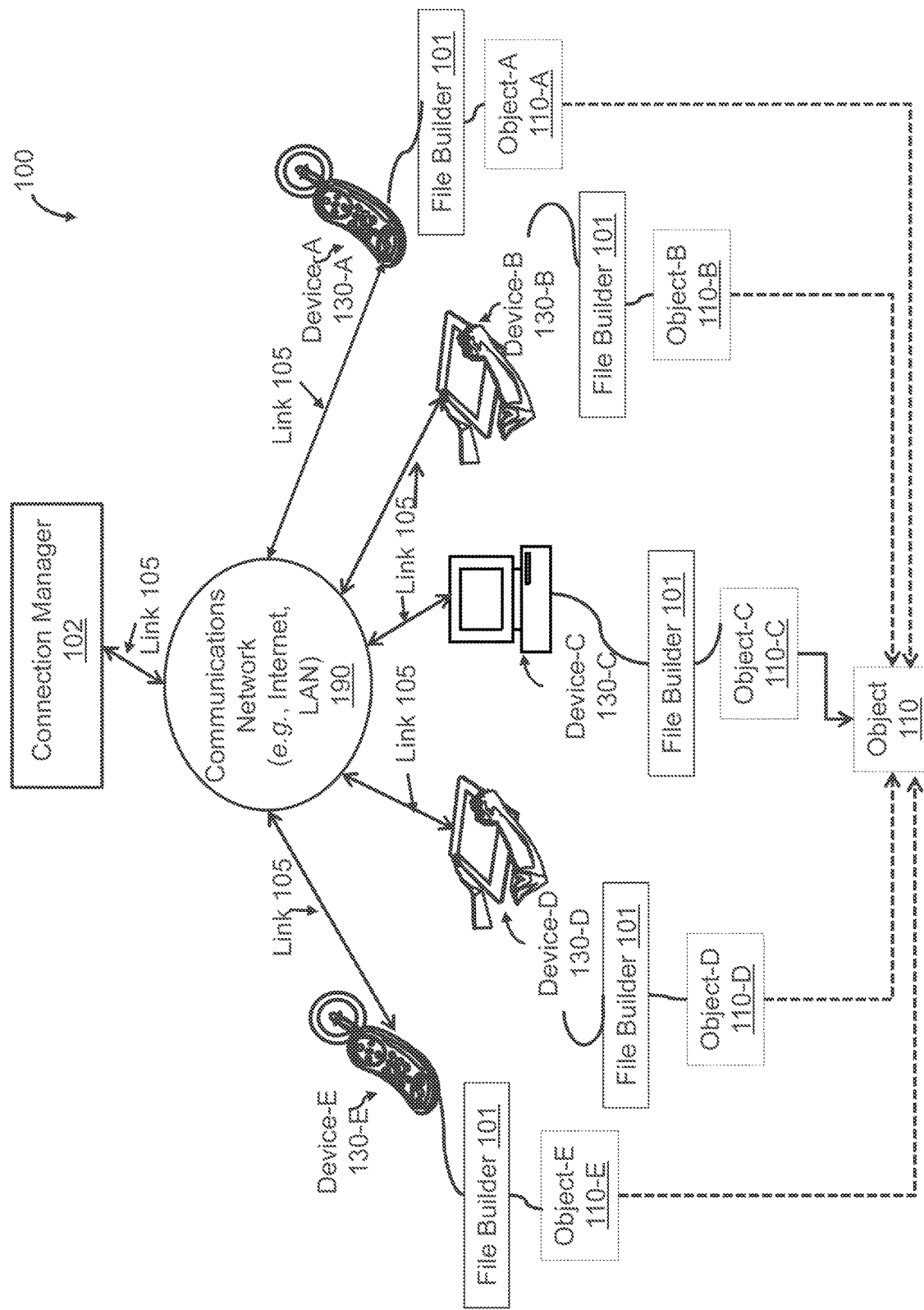
FIG. 1 is a block diagram of a communications system according to an illustrative embodiment disclosed herein.

FIG. 1 is a block diagram of a peer-to-peer (P2P) communications system 100 according to an illustrative embodiment disclosed herein. The P2P communications system 100 includes a server 102 that is coupled, via a communications network 190, with a number of communications devices 130-A, 130-B, 130-C, 130-D, and 130-E. The peer devices 130-A, 130-B, 130-C, 130-D, and 130-E can be interconnected and are in communications with one another. The communications devices 130-A, 130-B, 130-C, 130-D, and 130-E can be directly connected to one another, via a number of direct links 105, or connect to one another through the communications network 190.

The network 190 can be a private network (e.g., local area network (LAN)), a metropolitan area network (MAN), a wide area network (WAN), or a public network (e.g., the Internet). The communications network 190 can be a hybrid communications network 190 that includes all or parts of other networks. The networks 190 can have various topologies (e.g., bus, star, or ring network topologies).

The communications devices 130-A, 130-B, 130-C, 130-D, and 130-E are communications devices that are capable of establishing a connection to the communications network 190 and/or other communications devices 130-A, 130-B, 130-C, 130-D, and 130-E. Examples of the communications devices 130-A, 130-B, 130-C, 130-D, and 130-E that can be used with the embodiments disclosed herein include, but are not limited to, workstations, wireless phones, smart phones, personal digital assistants, desktop computers, laptop computers, tablet computers, handheld computers, smart phones, etc.

The communications devices 130-A, 130-B, 130-C, 130-D, and 130-E connect to one another and the network 190 via a number of links 105. Depending on the type of the communications device 130-A, 130-B, 130-C, 130-D, and 130-E, 130 used (e.g., wired or wireless device), the links 105 can be wired or wireless links.

The connection manager 102 tracks the communications devices 130-A, 130-B, 130-C, 130-D, and 130-E included in the communications system 100. For example, in some embodiments, the connection manager 102 can keep track of all communications devices 130-A, 130-B, 130-C, 130-D, and 130-E that are at any given moment connected to the communications network 190 (e.g., communications devices that are at any given moment online).

The connection manager 102 can be included in any computing device designated to run one or more services or function as a host. For example, the connection manager 102 can be included in a server (not shown). If included in a server, the server can be any kind of a server and offer a wide range of services. For example, the connection manager 102 can be included in a web server, database server, file server, mail server, gaming server, etc.

The connection manager 102 can include a database (not shown). In some embodiments, the connection manager 102 can allow the communications devices 130-A, 130-B, 130-C, 130-D, and 130-E to store certain information in the database of the connection manager 102. For example, in certain embodiments, each communications device 130-A, 130-B, 130-C, 130-D, and 130-E can have an allocated amount of storage in the database of the connection manager 102 that maintains a list of all other communications devices 130-A, 130-B, 130-C, 130-D, and 130-E. In certain embodiments, other files designated, for example files designated by the communications device 130-A, 130-B, 130-C, 130-D, and 130-E, 130 as having high priority, can be stored in the database 115.

The connection manager 102 can further maintain, in its database 115, information regarding digital content that each communications device 130-A, 130-B, 130-C, 130-D, and 130-E maintains and is wishing to co-author with other communications device 130-A, 130-B, 130-C, 130-D, and 130-E. For example, in one embodiment, the connection manager 102 can maintain a listing of all of the files that a communications device 130-A, 130-B, 130-C, 130-D, and 130-E has co-authored with other communications devices 130-A, 130-B, 130-C, 130-D, and 130-E (e.g., through peer-to-peer download) and/or has indicated that it is wishing to co-author. The connection manager 102 can store, in its database, a list of all communications device 130-A, 130-B, 130-C, 130-D, and 130-E that have, at some point, have co-authored at least a portion of a digital file. The connection manager 102 can maintain a listing of the communications devices 130-A, 130-B, 130-C, 130-D, and 130-E that have created a digital content file. In certain embodiments, the connection manager 102 can maintain information regarding each portion of digital content that is co-authored by the communications devices 130-A, 130-B, 130-C, 130-D, and 130-E.

In some embodiments, the connection manager 102 can maintain information that can be used to identify each communications device 130-A, 130-B, 130-C, 130-D, and 130-E. For example, the connection manager 102 can maintain information (e.g., login and password information) that can be used to uniquely identify and/or authenticate a communications device 130-A, 130-B, 130-C, 130-D, and 130-E user. In some embodiments, the connection manager 102 can maintain information (e.g., IP addresses) that can be used to uniquely identify a communications device 130-A, 130-B, 130-C, 130-D, and 130-E. 120, 130. The connection manager 102 can also maintain information indicating file access permissions for each communications device 130-A, 130-B, 130-C, 130-D, and 130-E. For example, the connection manager 102 can store information indicating which communications device 130-A, 130-B, 130-C, 130-D, and 130-E has the authorization to work on a certain file.

In some embodiments, the communications devices 130-A, 130-B, 130-C, 130-D, and 130-E can include a file builder application 101. The file builder 101 can be presented to a user (not shown) of the communications device 130-A, 130-B, 130-C, 130-D, and 130-E using a user interface 310 (shown in FIG. 3), such as a graphical user interface. The file builder 101 can be presented to the user using application software that provides an interactive medium for receiving input from the user. The file builder 101 can be a web-based platform. In some embodiments, each communications devices 130-A, 130-B, 130-C, 130-D, and 130-E can access the file builder 101 through the interactive medium provided by the application software or using the web-based interface.

The file builder 101 can be used for building and/or co-authoring digital content by the communications devices 130-A, 130-B, 130-C, 130-D, and 130-E. For example, one communications device 130-A can utilize the file builder 101 to create a digital content file or object 110. The digital content file 110 can start as a blank seed document that contains no digital information. In certain embodiments, the digital content file 110 can be created/started by assigning and/or obtaining (e.g., from the connection manager 102) a file identifier (file ID) that uniquely identifies the digital content 110 among the communications devices 130-A, 130-B, 130-C, 130-D, and 130-E in the network. Creation of a digital content file 110 can establish a set of encryption keys and permissions. The encryption keys and permissions can be used to specify various features of the digital content file 110 (e.g., which of the communications devices 130-A, 130-B, 130-C, 130-D, and 130-E in the network can contribute to building of the digital content file 110). Each authorized communications device 130-A, 130-B, 130-C, 130-D, and 130-E in the network maintains its own local copy of the digital content file 110. Local copies of the digital content file 110 as maintained by communications devices 130-A, 130-B, 130-C, 130-D, and 130-E are shown as Object-A 110-A, Object-B 110-B, Object C 110-C, Object-D 110-D, and Object-E 110-E, respectively. The users of each communications device 130-A, 130-B, 130-C, 130-D, and 130-E can continue working on the digital content file 110 while they are offline (not connected to the connection manager 102 through the communications network 190). When offline devices are back online (connected to the connection manager 102 through the communications network 190), all offline changes made to the document are propagated through the network to other contributing communications devices.

Changes made by each contributing device 130-A, 130-B, 130-C, 130-D, and 130-E to their respective copy of the object file 110-A, 110-B, 110-C, 110-D, and 110-E are merged into the object file of other contributing devices 130-A, 130-B, 130-C, 130-D, and 130-E. There is no master digital content file 110 maintained anywhere on the network 190 or by the connection manager 102. The object file 110 exists solely out of the network and in the local copies 110-A, 110-B, 110-C, 110-D, and 110-E stored by each communications device 130-A, 130-B, 130-C, 130-D, and 130-E. It should be noted that there can never be a conflict between the contributions made to the digital content file 110 by each of the contributing devices 130-A, 130-B, 130-C, 130-D, and 130-E. The users of each contributing device 130-A, 130-B, 130-C, 130-D, and 130-E can make their own changes to their own respective copies of the object file 110-A, 110-B, 110-C, 110-D, and 110-E and the changes are merged into the content files of other contributing devices.

The reason there can never be a conflict between the contributions made to the file by each contributing device is because the actual information added to a file when a user makes a contribution is the contribution itself, rather than the updated state of the file. Hence, although two users can dispute the final state of a file (e.g., document) if two conflicting contributions are made, neither can dispute the contributions themselves. As an example, if Author1 changes the title of this document to "method and apparatus for peer-to-peer file authoring" and Author2 changes it to "Apparatus and method for peer-to-peer file authoring", a natural conflict arises in terms of what the actual title should be. However, neither Author1, nor Author2 can contest that Author2 proposed "apparatus and method for peer-to-peer file authoring" as the title and that Author1 proposed "method and apparatus for peer-to-peer file authoring" and this is the information that is stored and synchronized in the file. It is not possible to have a conflict in authorship actions because they represent real, non-disputable events. Conflicts can arise during the resolution of these authorship actions to state (as above, when the system attempts to determine what the real title of the document should be) and these are always resolved either through policy in the state resolution (e.g., if it has been pre-determined that Author1's changes override Author2's) or by intervention by the user (e.g., Author1 and Author2 agree to select one title over the other). In the case, where it is resolved by user intervention, a new action is created in the object representing the decision that was made.

Merging of the changes made to local copies of the object file 110-A, 110-B, 110-C, 110-D, and 110-E can be done upon obtaining agreement of each communications device 130-A, 130-B, 130-C, 130-D, and 130-E user. Merging of the changes can be done live, for example when at least one device that is actively making changes to the digital content and another device that maintains a copy of the digital content are both online. Merging of the changes can also be when a device that has made off-line local changes to its own local copy of the digital content comes online and another device that maintains a copy of the digital content is also online. Merging of the digital content can be done in response to a request received from a user. In certain embodiments, merging can be done in response to a trigger signal generated in response to an action of a communications device user. For example, the merging can be done in response to opening of the digital content file by a user of a communications device 130-A, 130-B, 130-C, 130-D, and 130-E.

The communications device 130-A, 130-B, 130-C, 130-D, and 130-E can request merging of a desired digital content through the connection manager 102. In certain embodiments, the communications device 130-A, 130-B, 130-C, 130-D, and 130-E can select the desired digital content by searching, using a search field (not shown) provided by the user interface of the file builder 101 and/or the connection manager 102.

Figure 2:
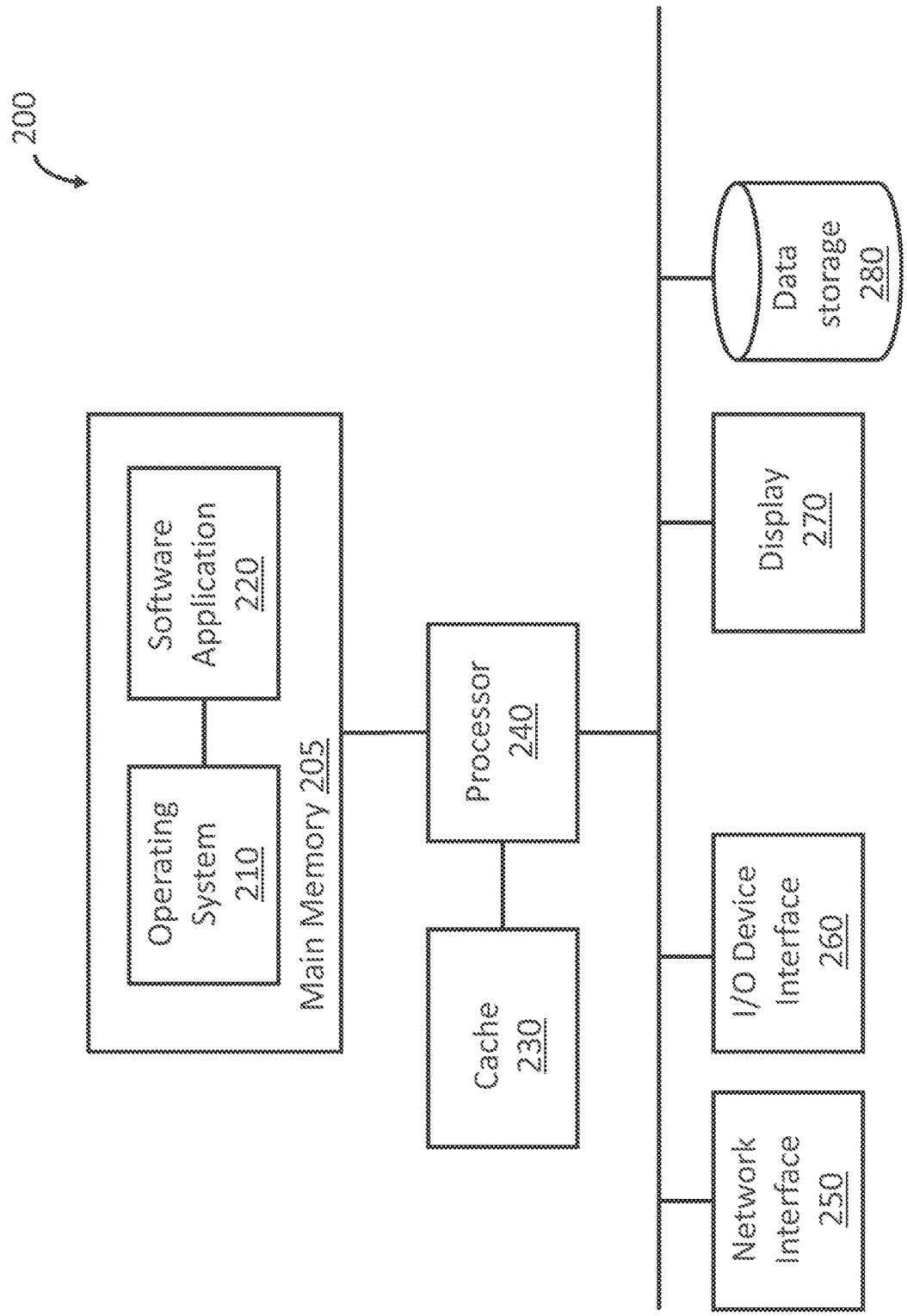
FIG. 2 is an example illustration of digital electronic circuitry or computer hardware that can be used with the embodiments disclosed herein.

FIG. 2 is an example illustration of digital electronic circuitry 200 or computer hardware that can be used with the embodiments disclosed herein. Without limitation, the techniques described herein can be implemented in digital electronic circuitry or in computer hardware that executes firmware, software, or combinations thereof, for example. The implementation can be as a computer program product, e.g., a computer program tangibly embodied in a machine-readable storage device, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communications network.

One or more programmable processors execute a computer program to perform functions of the invention, or method steps described herein, by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

The digital electronic circuitry 200 can include a main memory unit 205 coupled to a processor 240. In some embodiments, the main memory unit 205 can be coupled with a cache unit 230, which is responsible for storing copies of the data from the most frequently used main memory 205 locations. The processor 240 can be connected to various interfaces via an input/output (I/O) device interface 260. Processors 240 suitable for the execution of a computer program include, by way of example, both general and special purpose microprocessors, and any one or more processors of any kind of digital computer. Generally, a processor 240 will receive instructions and data from the main memory 205 (e.g., a read-only memory or a random access memory or both). The essential elements of a computer are the processor 240 for executing instructions and one or more memory devices (e.g., main memory 205) for storing instructions and data.

The memory unit 205 can hold various computer executable instructions and data structures including computer executable instructions and data structures that implement aspects of the techniques described herein. The memory unit 205 can also include an operating system 210 and be arranged to implement various conventional operating system functions including task and process scheduling, memory management, and controlled access to various devices, such as a data storage unit 280. The processes may include computer-executable instructions and data that are configured to implement various aspects of the techniques described herein.

Machine-readable storage devices suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Generally, the digital electronic circuitry 200 can also include, or be operatively coupled to receive data from or transfer data to, or both, one or more mass storage devices for the storing data 280, e.g., magnetic, magneto-optical disks, or optical disks. Data transmission and instructions can also occur over a communications network. Connection to the communications network can be provided using a network interface 250 coupled to the processor 240.

Figure 3:
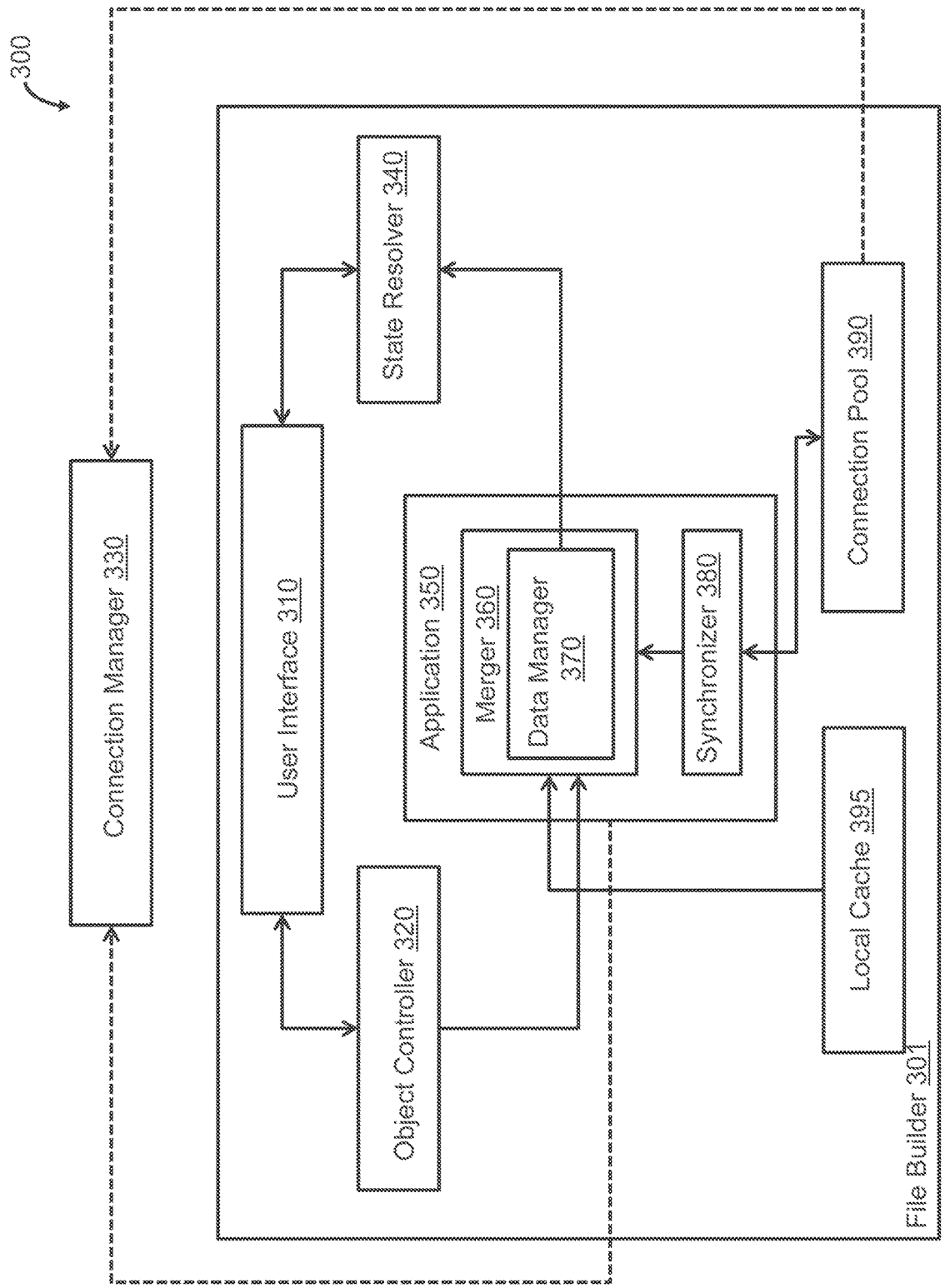
FIG. 3 is a block diagram of a computing environment according to an embodiment disclosed herein.

FIG. 3 is a simplified block diagram of a computing environment according to an embodiment disclosed herein. As noted previously (in connection with FIG. 1), the file builder application 301 resides within the communications device 130-A, 130-B, 130-C, 130-D, and 130-E and communicates with the connection manager 330 through a communications network 190 (shown in FIG. 1). FIG. 3 is a simplified, high-level, illustration of the computing medium disclosed herein and, as such, various elements (e.g., communications device and communications network) have not been shown in FIG. 3. The file builder application 301 ("file builder") can include various components in addition to those shown in FIG. 3.

The file builder 301 can include a user interface 310 that can be used by a communications device user to create or access the digital content file. The initial creation of the digital content file (e.g., creation of a seed digital content file or object) is usually done by the user of one of the communications devices. Information regarding the created file is then propagated through the communications system 100 to other communications devices in the system. Often the creation of an object file only includes creating or obtaining an encryption key or a file ID that is used to uniquely identify the object within the communications system 100. This unique file ID or encryption key can be generated by the connection manager 330, the originating communications device (i.e., the communications device creating the seed file), or by other network components (e.g., a server). The file ID can be assigned by a server. Other methods can be used for assigning a file ID. For example, each communications device can be assigned a number range, which they can use for generating file identifiers for files created by that communications device.

In some embodiments, the creation of a file almost always entails obtaining a file ID and obtaining a file ID is required for identifying the content on the network. However, obtaining a file ID can or may not entail also generating an encryption key if the user wishes the content to be protected.

Information regarding the created digital content file 110 can be propagated to communications devices that are being authorized to work on/contribute to the digital content using various methods. For example, the originating communications device can forward a link to the created digital content through known techniques (e.g., email, forwarding a link, etc.). In some embodiments, creating an object (digital content) by an originating communications device includes sharing the object with other communications devices in the communications system (i.e., peer communications devices). Sharing the object with peer communications devices can create an action that indicates to the connection manager 330 that the originating communications device would like to allow the peer communications devices to contribute to the contents of the digital content file.

The file ID can point to the location of the local copy of the digital content file within each communications device. The file ID can be used to establish a set of encryption keys and permissions.

The file ID can be used to universally identify the digital content file in the network. Each device stores a database of all the user's content on the device and is responsible for ensuring that it can locate the local copy of the file from the file ID. Also, the encryption keys and permissions are often not related to the file ID. They often travel together, because it is typically not useful to notify someone about the existence of a file without giving them the necessary keys to decrypt its content, but they are not directly related. An example use scenario includes the following procedures: a) file ID is obtained for file, b) random encryption key is generated, c) permissions are established, and d) a secure bundle containing the file ID, encryption key, and permissions is created and shared with other users.

The digital content file, once created and/or shared, resides in the local cache 395 of each communications device. It can be left to each device's discretion to choose how to store the content. Each device is free to use it's own encodings, encryption, compression, database techniques, etc. so long as given a file ID it can locate the correct file content and translate it back to the uniform agreed network representation.

The file builder 301 includes an application component 350 that is responsible for managing the contributions made to the digital content file 110. The application component 350 can include a merger 360 and a synchronizer 380. The synchronizer 380 communicates with the connection manager 330 through a connection pool unit 390. The connection pool 390 communicates with the connection manager 330 to create connections with other communications devices in the communications network (i.e., peer devices) that have been authorized to make contributions to the digital content and are online. If the connection pool 390 of the communications device determines that its peer devices are in fact online, it obtains a copy of the difference between its own local copy of the digital content file and the copies of the digital content file stored locally on each peer device. For example, referring to the communications system 100 shown in FIG. 1, assuming that all five peer devices 130-A, 130-B, 130-C, 130-D, and 130-E are online, the connection pool 390 of device-A 130A can check with the connection manager 330 to verify whether the other peer devices (device-B 130B, device-C 130C, device-D 130D, and device-E 130E) are online. If they are online, the connection pool 390 will connect to them and obtain the non-locally available content in the local object files of the peer devices (object-B 110B, object-C 110C, object-D 110D, and object-E 110E).

The synchronizer 380 obtains the local copies of the object files of the peer devices (object-B 110B, object-C 110C, object-D 110D, and object-E 110E) and compares them against the local copy (object-A 110A). If the synchronizer 380 determines that the local copies of the object files of the peer devices (object-B 110B, object-C 110C, object-D 110D, and object-E 110E) include contributions that are not already included in the local copy of the digital content 130-A, the merger 360 merges the new contributions to the digital content (contributions made by the peers that are not already in the local copy of the digital content file 110-A) into the digital content file 110-A. It should be noted that it is extremely inefficient to obtain each peer's local copy of the file and compare it to the local copy and merge the new content. Accordingly, instead, using the distributed branch-and-bound search, the synchronizer transmits high-level information about the file content between peers to facilitate determining the differences between the files across the network and then only the actual content that is different between peers is transmitted.

The data manager maintains the core data structure of the file. Preferably all interactions with the data structure occur through the data manager and it basically ensures that the file content adheres to a set of policies. For example, it ensures that no two identical actions are inserted into a file and furthermore that all action links are causal. It provides for fast traversal of actions in support of state resolution and also supports some basic functionality for synchronization. The object controller provides a uniform interface to applications both locally and across the network. For example, if a peer opens a file, the object controller creates and initializes the application. Similarly, if a peer across the network wishes to synchronize a particular file with you, their request comes through the object controller.

The digital content file (object 110) can start as a blank container that grows as contributions from communications device 130-A, 130-B, 130-C, 130-D, and 130-E are added to the file. As noted, each person has a local copy of the digital content that is synchronized, possibly upon receiving approval from the communications device users, to include contributions made by other communications device users in the communications system 100.

The contributions by each communications device can be made while the communications device user is working offline and added to the digital content file once the user is back online. The contributions are added to the local copy of the file (and hence the file proper as it exists in the network) immediately even if the user is offline. However, those contributions do not become available to other devices until the device comes online. Whether or not all parts of a file are available on the network, the "master copy" of the file is the merger of all of the local copies of the file on all the devices that have ever authored into it. Contributions to the digital content file can also be made in real time. Specifically, communications device users can make their contributions to the digital content while they are online and actively exchange their contributions to their local copies of the digital content file with other communications device users.

As noted, the object file 110 (digital content file) exists in the local copies maintained by each communications device in the communications system 100. Since the object file exists outside of the network, the notion of file ownership is less prominent (e.g., the originating user, who created the file, does not necessarily have all the contents of the file). The contents of the object file 110 exist in the local copies and are updated to include contributions of the users of other communications devices.

In preferred embodiments, files only store authorship actions. Therefore, conflict between the contents of files can be avoided. For example, a "document" file may internally appear as:

Author2 created a sentence at 12:04 pm: "this is a nice document."

Author2 revised the sentence he created at 12:04 pm to read: "This is a very nice document."

At 12:08 pm, Author1 modified the sentence Author2 created at 12:04 pm by changing the period to an exclamation mark.

This explains the reason the contents of a file cannot be disputed. Specifically, although the authors may not agree about the final representation of a document, they cannot dispute the authorship actions that have been performed on that document because they represent real events.

The synchronizer ensures that everyone has the same content in their local copy of the file. That means that ideally, where everyone was always connected and online, everyone would have identical information in his/her local copies of the file. Therefore, in the example above, even if Author2 disagrees with Author1 that there should be an exclamation mark at the end of the sentence, Author2 cannot deal with the issue by removing that action from his local copy of the file. Once an action has been added it can never be removed from a file. If Author2 disagreed with Author1 about her change, Author2 needs to handle that by adding a new action:

At 12:10 pm, Author2 ignores the change Author1 made at 12:08 pm.

Figure 4:
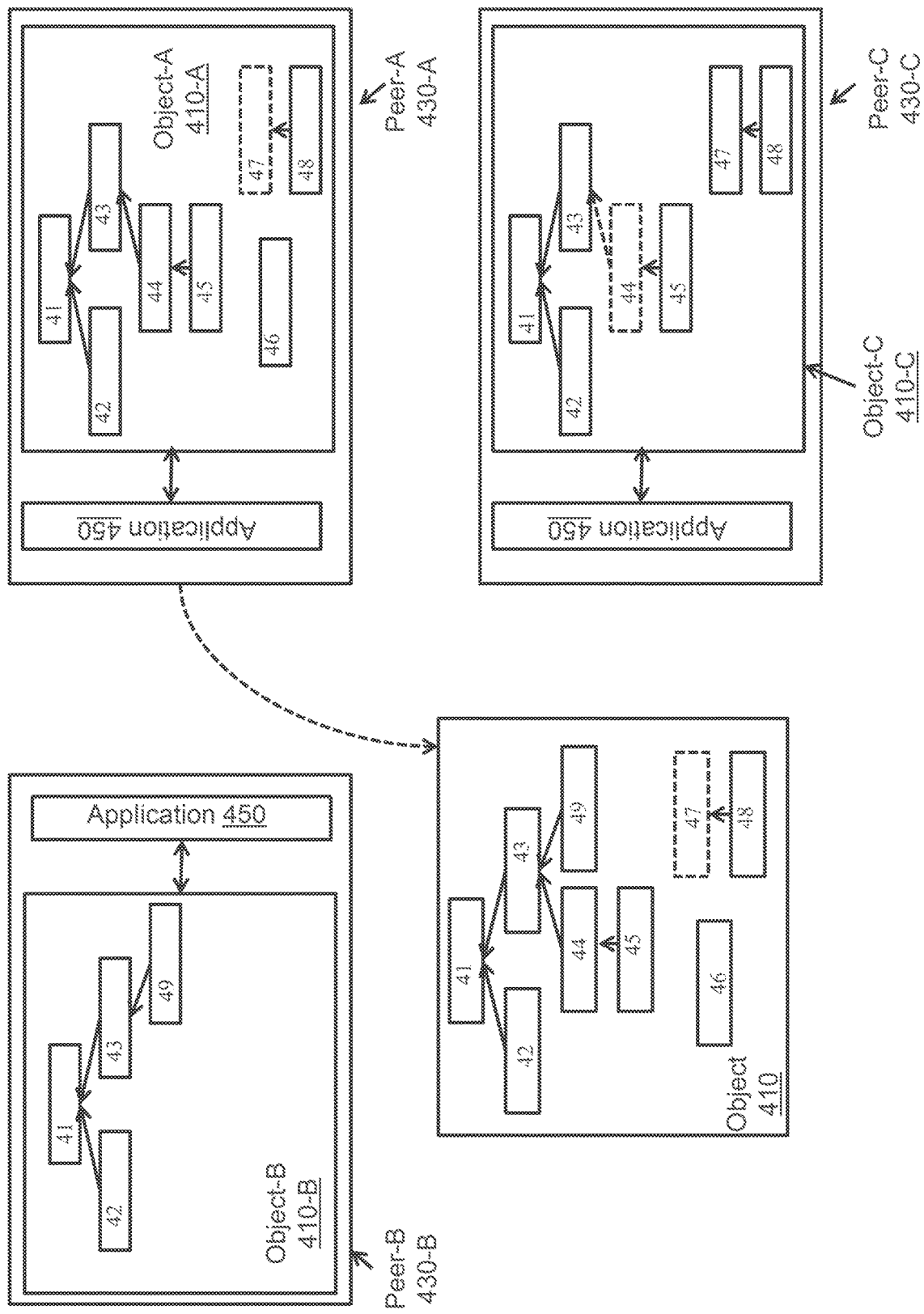
FIG. 4 is a simplified block diagram of digital content synchronization operations according to an embodiment disclosed herein.

The state resolver does not modify the content of the file and is not involved in synchronization. State resolver turns the graph of actions stored in the file into a state that can be viewed by the user. If two actions have conflicting implications (e.g., "Author2 changes the title to X" and "Author1 changes the title to Y"), the state resolver may handle this conflict by policy (e.g., always prefer Author1's modifications over Author2's) or it may present the conflict to the user to resolve, in which case the resolution is authored into a new action (e.g. "Author1 and Author2 agree to use Author2's title"), FIG. 4 is a simplified block diagram of digital content synchronization operations according to an embodiment disclosed herein. As explained previously, each peer, namely Peer-A 430-A, Peer-B 430-B, and Peer-C 430C, in the communications system maintains its own local copy of the digital content (object 410). Each box in 41-49 represents a single action in the file. Some of the boxes are dashed because even though a peer may know about the existence of an action in the file that peer may not have the action and it may not be available on the network. This can happen for many reasons (connectivity reasons, devices being offline, etc.) but the peer may or may not be able to acquire all the actions it knows about in a file. The state resolver works with the action graph the peer maintains and tries to create the most sensible presentation of the state based on what it has. Therefore, when Peer-C is offline and it is the only one with action 47, this action is unavailable on the network. Peer A has already received action 48 which references action 47 so it knows about action 47 and it knows it is missing it but it has no way to acquire it.

In the example shown in FIG. 4, all three peers Peer-A 430-A, Peer-B 430-B, and Peer-C 430C appear to have certain elements ("actions") of the object file in their local copies (Object-A 410-A, Object-B 410-B, and Object-C 410C). Specifically, in this example, actions 41, 42, and 43 are included in all three local copies (Object-A 410-A, Object-B 410-B, and Object-C 410C). This can mean that at some point, after the object file 410 was created, these devices were online and the addition of actions 41, 42, and 43 to the digital content file was propagated and merged into their local copies. Since the last propagation and merging of the actions (namely actions 41, 42, and 43), each peer (Peer-A 430-A, Peer-B 430-B, and Peer-C 430C) appears to have made its own contribution to its local copy (Object-A 410-A, Object-B 410-B, and Object-C 410C). For example, actions 44, 45, and 46 have been contributed to the local copy of the digital content file 410-A by Peer-A 430-A. Actions 47 and 48 have been added to the local copy of the digital content file 410-C by Peer-C 430-C. Action 49 has been added to the local copy of the digital content file 410-B by Peer-B 430-B.

Peer-B 430B appears to have gone offline (or rejected and/or failed to request addition of new actions to its copy 410-B of the digital content file) since the initial merge took place (adding actions 41, 42, and 43). Once this peer 430-B is available, and/or upon availability and approval of Peer-A 430-A and/or Peer-B 430-B, its contribution (addition of action 49) will be added to their local copies of the file.

Peer-A and Peer-C appear to have been online and synchronized at some point after the initial merging of the actions. Specifically, Peer-C 430-C has managed to acquire action 45 and portions of action 44 from Peer-A 430-A. Peer-A 430-A also appears to have managed to acquire action 48 and portions of action 47 from Peer-C 430-C.

If Peer B 430-B becomes available while Peer-A 430-A is still available, the synchronizer 380 and action resolver 340 of the file builder application 401 of Peer-A 430-A can determine that Peer-B has made a new contribution to the digital content file 410-B that is not included in the local digital content copy 410-A maintained by Peer-A 430-A. In that case, the merger 360 of file builder application 401 of Peer-A 430-A merges action 49 into the local digital content copy 410-A maintained by Peer-A 430-A. Upon completion of this merge, the final copy of the digital content copy 410 (locally stored by peer-A 430-A) includes all contributions made to the digital content file 410 that has been received by Peer-A 430-A.

Two types of digital content, namely static content and dynamic content, can be employed with the embodiments disclosed herein. Static content can include large, data intensive content such as pictures, sequences of video, etc. Dynamic content incorporates information regarding the relationship between different digital content files and can be obtained through synchronization. Dynamic representation of digital content allows for using an action-based representation of the digital content in which actions provide a natural quantization for transport of the digital content across the communications network.

Some embodiments disclosed herein can employ an action-based model to represent the dynamic exchange of content across the communications network. Actions form a fundamental unit for transport across the network and can be used in synchronization of digital content. Further, actions preferably provide a complete, lossless history and, as such, an action-based representation has a very powerful mechanism for revision control. The system is predicated on the action-based representation. Synchronization relies on the fact that content is represented as actions to be able to determine the differences between local copies of a file and this is also what makes it possible for people to author independently on a file without creating conflicts in the file's content. Every file just represents the set of authorship actions that have been performed by all participants in the object. Hence, there can be no conflicts because, although two participants may author actions that result in a conflicting representation, the actions themselves do not conflict with each other. The synchronizer ensures that everyone has the same actions and the state resolver turns those actions into something that can be viewed by the user. Furthermore, the state resolver does not modify the file's contents. It may present a conflict in the representation that causes the user to author a new action resolving that conflict but the state resolver sits in between the file and the user interface and just turns the action graph in the file into a state that can be viewed by the user. The reason this supports revision control is because, by looking at a subset of the actions we can generate old versions of the file. For example, if a peer has a document and it wants to see what it looked like yesterday, it can instruct the state resolver to ignore all of the actions authored today.

Given an intelligent state resolution model, it is possible to generate a sensible state even in the presence of an incomplete set of actions. This is in contrast to the state-based representation of a file where typically the entire file is acquired before displaying any part of it. If actions are not available, the state resolver produces a slightly out-of-date representation of the content rather than no content at all. This can be important for in a P2P environment, where there are no guarantees that all the data will be available (since some peers can go offline and make digital content unavailable). Actions, once created, cannot be changed or deleted. This ensures that synchronization of digital content can continue effectively and supports revision control. It supports revision control as above, by keeping the entire history of interactions with a piece of content it is possible to "roll back" the content to any time (state) by selecting a subset of actions to process with the state resolver. It supports synchronization because it establishes a fixed target. If actions can be changed or deleted then it is not possible for the synchronizer to know who has the most "up-to-date" information. In the case where actions are static and permanent, a peer can know with certainty that it has fully synchronized with another peer by a) acquiring all of the actions that they possess and it does not; and b) by providing them with all of the actions that you possess that they do not. In certain embodiments, in order for the content represented by an action to be deleted, another action must be created that directs the state resolver to discard the content from that action.

For example, assuming that the digital content is word document, one action (Action-X) may correspond to adding the words: "the quick brown fox" after the content from another action, Action-Y. If a peer later wishes to delete those words, the peer can add an action to discard Action-X.

Peer communications devices author actions and view states. Actions are not directly consumed (or viewed) by user, rather they are first resolved to a corresponding state. Actions capture the history of user interactions with a piece of content. Therefore, in the example of a document, the actions are things like "added a word," "changed a sentence," "applied formatting," etc. However, it is not sensible to view a document as a list of all the changes that were made to it since it was created. Instead documents are viewed as the "finished product." Accordingly, although in the underlying file, all of the actions are stored, the state resolver processes all action and turns them into state for presentation to the user.

Each action is uniquely identified by a synchronization ID and a checksum when that action is generated. This representation provides a mechanism that can be used for both synchronization and for referencing other actions in order to create action-graphs. In order to represent more complex content, it is valuable to be able to represent the relationship between actions (such as the example before of deleting words from a document by adding a new action which discards the previous one) using a graph-based representation. Each node in the graph can represent a communications device 130-A, 130-B, 130-C, 130-D, and 130-E, 130 and can store any combination of content information such as payload, directives, or links to other nodes.

In some embodiments, all of the content in the peer-to-peer communications system can be stored in a directed acyclic graph of objects and each content file can be represented by a sub-graph. Such graph-based relationships organize the actions into a directed, acyclical graph (DAG) because of causality (e.g., it is impossible to reference an action that will be created in the future).

In some embodiments, two graphs are considered: the action graph inside a file. This action graph represents the content of the file. It is composed of a number of potentially unconnected actions that constitute the information stored by that file. This graph is directed and acyclic because an action cannot possibly reference another action created after it (due to causality). An example of this would be in a document where one action may be "Author2 added words X at time 12:00 pm" and another may be "At 12:05 pm, Author2 deleted the words he added at 12:00 pm". Here, the second action references the first. Of course, it is not sensible to say "At 12:30 pm, Author2 deleted the words he is going to add at 1:00 pm," hence an action graph must be a DAG. The other graph is the graph of files in the network. This graph represents the relationship between various files and is, almost certainly, not directed and acyclic. An example of this is if a document contained an action such as: "At 12:45 pm, Author2 added picture (FILE ID#X) to the document". This creates a relationship between the files which is helpful in knowing from whom to acquire content in the P2P network and also in discovering related content.

In order to resolve states, each peer device consults the graph of actions in the network to determine if they have the same tags or actions as the tags or actions in the local copy of their digital content. If the actions in the network are not similar to the ones maintained by the peer device in its local copy of digital content, that peer proceeds to share the actions that are not already in the network with the other peer devices. State resolution can be an entirely local process. It takes a xlocal action graph and turns it into a state that can be viewed. The synchronizer is the one who works across the network to make sure everyone has the same set of actions.

In certain embodiments, each peer device can broadcast a synch token or a range of synch IDs that represents its understanding of how the action-graph is shaped. The synch token can specify the actions that correspond to each synch ID and/or each hash function.

The peers can sort their actions based on the action synch ID and/or hash function. This can facilitate determining which actions are included in the local copies of digital content files of other peers. Specifically, each peer can ask its peers to subdivide their broadcasted action ID range until an action missing from the local copy of the digital content of the requesting peer is discovered. For example, in FIG. 4, Peer-A 430-A can broadcast to Peer-C 430-C that actions 41 through 48 in its local copy 410-A correspond to synch IDs X through Y. If any peer is in disagreement with this information, it can request that this range be subdivided and re-broadcasted. For example, Peer-A 430-A can broadcast to Peer-C 430-C that actions 41 through 44 correspond to synch IDs X through X0 and actions 45 through 48 correspond to synch IDs Y0 through Y in its local copy 410-A. In a subsequent broadcast, Peer-A 430-A can broadcast to Peer-C 430-C that it has actions 45 through 46 corresponding the sync IDs Y0 through Y1 and 47 through 48 corresponding to synch IDs Y1 to Y in its local copy 410-A. This can help Peer-C 430-C identify that Peer-A 430-A has an action (action 46) that is missing from its local copy of the content file 410-C.

This process, while useful for determining differences between sets of actions that are dynamic can be very expensive (both in terms of computation and network overhead) relative to transferring a piece of static content. Hence, as regions of dynamic content stabilize, they can be converted to static content. This prevents the cost of synchronizing a region that is no longer changing as well as giving a much less expensive and more reliable mechanism for new peers entering the network to obtain this content.

Traditional file-systems bundle content behind containers called "files." These files hold all of the information necessary to process pieces of content. Files that tend to be accessed together can then be proactively grouped into "directories." The directory structure can become a rudimentary index for the content such that each piece of content is uniquely identified by its directory structure and filename. However, such a unique representation causes problems for the user, especially if the mapping of the content onto the directory structure is ambiguous (e.g., if a person has a picture of his/her brother driving a car, it could be placed with equal validity in either the "cars" or the "family" subdirectory of "pictures"). This problem can be exacerbated when users share content in a network of distributed devices because it becomes even less likely that users will agree about content organization. Furthermore, it is often unlikely that users will agree to a unique mapping between filename and the content it represents (e.g., the file "tree.jpg" may represent a very different image for two different users). These limitations have been addressed traditionally by creation of search indices. Such indices allow a many-to-many mapping between keywords and associated files, which enables users to find their desired content by recalling only a key piece of information about that file and not its unique identity in the system. However, the creation of a search index can be a proactive and laborious process and may not scale effectively to systems with large amounts of content.

In certain embodiments, the peer communications device initiating a digital content file can have "collaborative" (e.g., read and write) access to some content and other peer devices can have their access limited to "consumer" (e.g., read-only) access. When operating in a collaborative environment, the action-based representation the "collaborative" version of the document can potentially contain much more information than the "read-only" version. In such environment, every peer device can store the digital content and access to the digital content is managed through permissions, the collaborators can store both the read and write and the Read-only versions of the content and provide the Read-only content to consumers on demand, or the collaborators store the read and write content and the consumers store the read-only version and the translation is handled by the channel between the peers.

Figure 5:
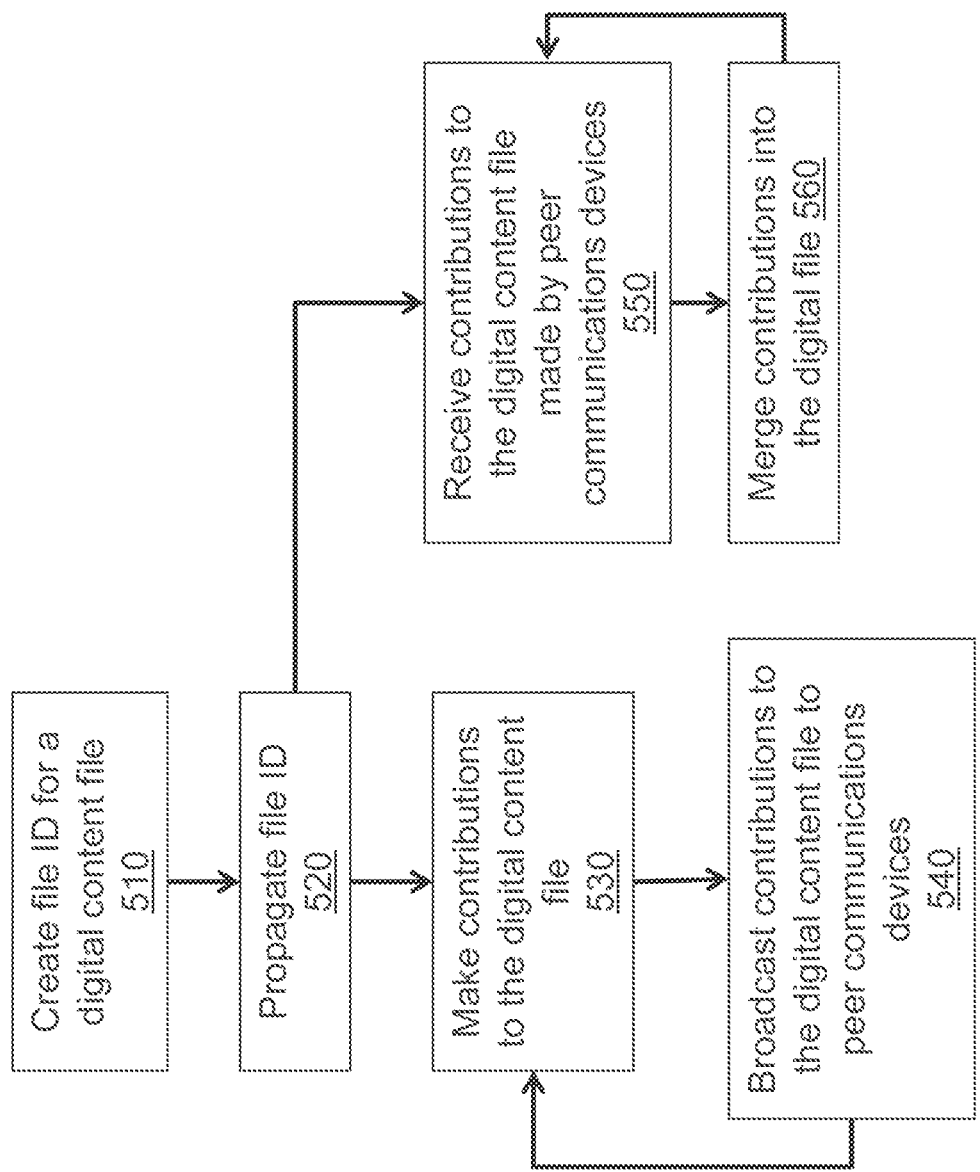
FIG. 5 is a simplified flow diagram of the procedures that may be used by embodiments disclosed herein for co-authoring digital content.

FIG. 5 is a simplified flow diagram of the procedures that may be used by embodiments disclosed herein for co-authoring digital content. A communications device in a peer-to-peer communications system can create a file ID for a digital content file 510. The file ID can point to the location of the local copy of the digital content file within each communications device. The file ID can be used to establish a set of encryption keys and permissions. The originating communications device can share the file ID with other communications devices in the communications system (i.e., peer communications devices) 520. Sharing the object with peer communications devices can be used to allow the peer communications devices to contribute to the contents of the digital content file. Alternatively, in place of creating 510 and sharing 520 the file ID, a peer communications device can receive the information required to access and/or contribute to the digital content file.

The peer device can make its own contributions to the digital content file 530 and/or obtain contributions made to the digital content file by its peer communications devices 550.

If the peer device is making its own contributions to the digital content file, these contributions are propagated through the communications system to its peer devices 540. The propagation of contributions can occur when the device is online and available.

If the peer device is obtaining the contributions of its peer devices to the digital content file, any contributions made by its peers that are not already included in the local copy maintained by the peer device are merged into the local copy of the digital content 550.

While the invention has been particularly shown and described with reference to specific illustrative embodiments, it should be understood that various changes in form and detail may be made without departing from the spirit and scope of the invention.

What is claimed is:

1. A computerized method for co-authoring a digital content file in a multi-node peer-to-peer communications system, the multi-node peer-to-peer communications system including a server that connects two or more peer communications nodes via a communications network, each peer communications node representing a peer communications device, the method comprising:
   storing a local copy of the digital content file in a plurality of the peer communications devices disposed in the multi-node communications system;
   comparing, by a first one of the peer communications devices, authorship actions contained in the local copy of the digital content file stored in the first peer communications device to authorship actions contained in a local copy of the digital content file previously stored in a second one of the peer communications devices; and
   responsive to a result of the comparison being that the local copy of the digital content file stored in the first peer communications device has different authorship actions than those contained in the local copy of the digital content file stored in the second peer communications device, merging the authorship actions of the local copy in the first peer communications device with the authorship actions of the local copy in the second peer communications device, such that the local copies contain all of each other's authorship actions, including actions that result in conflicting representations of the digital content;
   wherein the server does not maintain a master copy of the digital content file.

2. The method of claim 1 wherein storing the local copy of the digital content file includes creating the digital content file by an originating peer communications device.

3. The method of claim 2 wherein creating the digital content file includes obtaining a file identifier for uniquely identifying the digital content file within the multi-node communications system and propagating the file identifier to other peer communications devices disposed in the multi-node communications system.

4. The method of claim 3 further including identifying each of the local copies of the digital content file using the file identifier.

5. The method of claim 3 farther including obtaining the file identifier from a connection manager that monitors connectivity of the plurality of communications peer devices to the multi-node communications system.

6. The method of claim 5 wherein the connection manager is included in the server.

7. The method of claim 1 wherein the comparing includes dividing the authorship actions of the local copies into a number of portions, comparing the portions, and continuing to divide the portions into smaller portions and comparing the portions until an authorship action contained in one of the local copies and not contained in another of the local copies is identified.

8. The method of claim 1 wherein the comparing is performed in response to a trigger signal generated by at least one of the peer communications devices.

9. The method of claim 8 further including generating the trigger signal by the first peer communications device at least one of accessing and opening a local copy of the digital content file.

10. A computer program product, tangibly embodied in a non-transitory computer readable storage medium, comprising instructions being operable to cause a data processing system to:
   store a local copy of the digital content file in a plurality of peer communications devices disposed in a multi-node peer-to-peer communications system, the multi-node peer-to-peer communications system including a server that connects two or more peer communications nodes via a communications network, each peer communications node representing a peer communications device;
   compare, by a first one of the peer communications devices, authorship actions contained in the local copy of the digital content file stored in the first peer communications device to authorship actions contained in a local copy of the digital content file previously stored in a second one of the peer communications devices; and
   responsive to a result of the comparison being that the local copy of the digital content file stored in the first peer communications device has different authorship actions than those contained in the local copy of the digital content file stored in the second peer communications device, merge the authorship actions of the local copy of the digital content file stored in the first peer communications device with the authorship actions of the local copy in the second peer communications device, such that the local copies contain all of each other's authorship actions, including actions that result in conflicting representations of the digital content file;
   wherein there is no master copy of the digital content file maintained in a central server.

11. The computer program product of claim 10 further comprising instructions being operable to cause the data processing system to store a local copy of the digital content file as a function of creating the digital content file in an originating peer communications device.

12. The computer program product of claim 11 further comprising instructions being operable to cause the data processing system to create the digital content file by obtaining a file identifier for uniquely identify Mg the digital content file within the multi-node communications system and propagating the file identifier to other peer communications devices disposed in the multi-node communications system.

13. The computer program product of claim 12 further comprising instructions being operable to cause the data processing system to identify each of the local copies of the digital content file using the file identifier.

14. The computer program product of claim 12 further comprising instructions being operable to cause the data processing system to obtain the file identifier from a connection manager that monitors connectivity of the plurality of communications peer devices to the multi-node communications system.

15. The computer program product of claim 14 wherein the connection manager is included in the server.

16. The computer program product of claim 10 wherein the comparing includes dividing the authorship actions of the local copies into a number of portions, comparing the portions, and continuing to divide the portions into smaller portions and comparing the portions until an authorship action contained in one of the local copies and not contained in another of the local copies is identified.

17. The computer program product of claim 10 wherein the comparing is performed in response to a trigger signal generated by at least one of the peer communications devices.

18. The computer program product of claim 10 wherein the data processing further comprising instructions being operable to cause the first peer communications device to generate the trigger signal by at least one of accessing and opening a local copy of the digital content file.

19. The method of claim 1, wherein each of the local copies includes a respective log of authorship actions, and the peer communications devices are configured for outputting respective representations of the digital content file by executing at least a subset of the logged authorship actions.

20. The method of claim 19, wherein the logged authorship actions are stored as a plurality of identifiers sortable so that a first of the sorted identifiers corresponds to a first action number of an identifier range and last of the sorted identifiers corresponds to a final action number of the identifier range, with all of the other sorted identifiers corresponding to action numbers within the range, and the comparing includes iteratively comparing consistencies between respective portions of the range until an action number of the range of the second communications device that is missing from the range of the first communications device is identified.

21. The method of claim 2, wherein the originating peer communications device can limit the other peer communications devices to read-only access of the digital content file created by the originating peer communications device.

22. The method of claim 19, wherein the authorship actions are stored in directed acyclic graphs, each graph representing the contents of a respective local copy.

23. The method of claim 19, wherein the authorship actions identify authors to whom the authorship actions are attributed.

24. The method of claim 1, further comprising:
resolving the conflicting representations by making a decision based on a policy or based on user intervention; and
adding a new action to each local copy, the new action representing the decision that resolved the conflicting representations.

25. The method of claim 24, further comprising applying of the authorship actions to the digital content and presenting the resulting digital content file to a user.

26. The computer program product of claim 10, further comprising instructions being operable to cause a data processing system to:
resolve the conflicting representations by making a decision based on a policy or based on user intervention; and
add a new action to each local copy, the new action representing the decision that resolved the conflicting representations.

27. The computer program product, of claim 26, further comprising instructions being operable to cause a data processing system to apply the authorship actions to the digital content and present the resulting digital content file to a user.

* * * * *